J. W. FARRELL.
Machine for Soldering Sheet-Metal Cans.
No. 222,480. Patented Dec. 9, 1879.
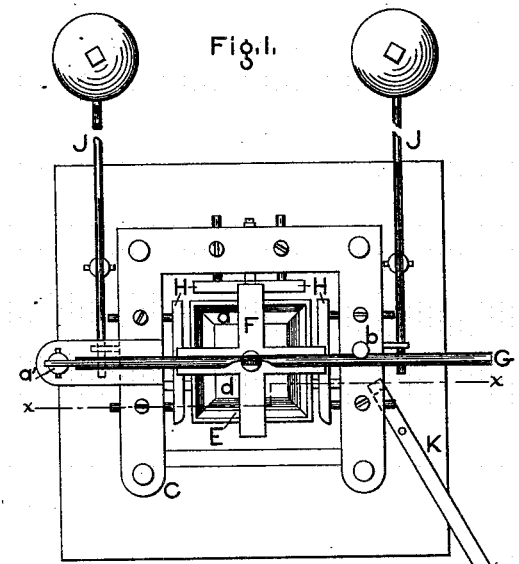
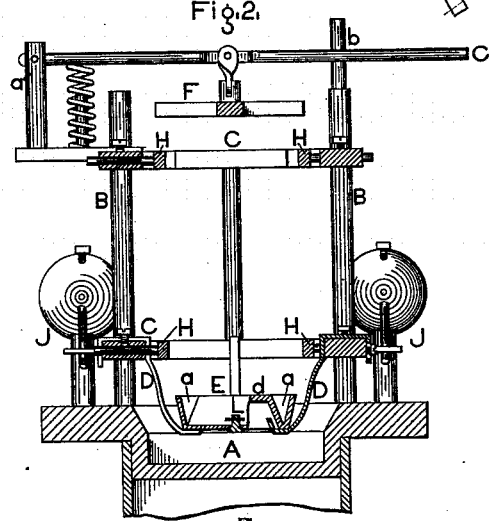
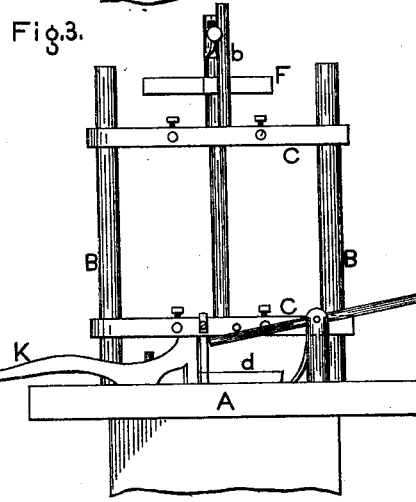

UNITED STATES PATENT OFFICE.

JAMES W. FARRELL, OF PHILADELPHIA, PENNSYLVANIA.

IMPROVEMENT IN MACHINES FOR SOLDERING SHEET-METAL CANS.

Specification forming part of Letters Patent No. 222,480, dated December 9, 1879; application filed October 16, 1879.

*To all whom it may concern:*

Be it known that I, JAMES W. FARRELL, of the city and county of Philadelphia, and State of Pennsylvania, have invented a new and useful Improvement in Apparatus for Dipping and Soldering Sheet-Metal Cans, which improvement is fully set forth in the following specification and accompanying drawings, in which—

Figure 1 is a top or plan view of the apparatus embodying my invention. Fig. 2 is a side elevation, partly sectional. Fig. 3 is a view of another side thereof.

Similar letters of reference indicate corresponding parts in the several figures.

My invention consists of a rising-and-falling carriage supporting the head on which the cans are placed while being dipped and soldered, and having means for clamping the can to the carriage, said means being supported on and moving with the carriage, as is also the lock for the lever of said means. The carriage is fitted to uprights or guides, so as to cause uniformity of the work, and provision is made for elevating the carriage and holding it elevated, for raising the can from the solder, reversing it, and removing it from the carriage, and application of another can to be dipped and soldered.

It also consists in forming the supporting-head with a face on which rests the top or bottom of the can, for preventing buckling or warping of said top or bottom during the dipping and soldering operation, and a groove for receiving solder that may escape upwardly. Said supporting-head dips into the solder-pot, and, in addition to its flat top face, has a groove into which any solder that may rise between the flange or chine of the can and head is permitted to drop, thus preventing the gathering or lodgment of such solder on the can top or bottom.

The invention also consists of a valve or valves for permitting the escape of solder and dross from the supporting-head.

It also consists of gages adjustably fitted to the carriage for adapting the apparatus to cans of different sizes.

Referring to the drawings, A represents a solder-pot, which is properly supported over a furnace or other heating medium for melting the solder of said pot. From the top wall of the pot or surrounding ledge thereof there rise uprights or guides B, to which is fitted a rising-and-falling carriage, C, consisting of suitable horizontal and vertical pieces connected together, and forming a frame-work, from the bottom of which are suspended hangers D, on which is sustained the head E, for supporting the cans to be dipped and soldered. This head is constructed of metal of the shape of the heads of the can, and formed on its upper face with a groove or recess, $a$, extending near the sides thereof, and a recess on its under face for the reception of the ends of the hanger on which the head is sustained.

F represents a presser-clamp, which is suspended from a lever, G, pivoted at one end to a post, $a'$, and engaging at the other end with a notched or locking standard, $b$, said post and standard rising from the top of the carriage C, and the presser-clamp overhanging the center of the solder-pot.

To the upper and lower pieces of the frame of the carriage C there are fitted gages H, consisting of horizontal bars located on the inside of said carriage, and connected to pins which slide in said upper and lower pieces of the carriage, and held in position by set-screws suitably applied.

The gages serve to set the can in position and hold its upper and lower portions, and the can fits snugly within the spaces of said gages.

It is evident that the gages permit the application of cans of different sizes, it only being necessary to adjust them relative to the sizes of the cans.

To the wall or ledge surrounding the solder-pot are mounted weighted levers J, which bear against the carriage, so as to counterbalance or elevate it, and a lever, K, which is adapted to be swung under the carriage when elevated.

L represents a valve, which is fitted to the head E, and adapted to close upward from the bottom of said head. The valve-opening communicates with the groove or recess on the upper face of the head, and there may be a valve for each side of the head.

The upper face of the head E within the side grooves or recesses is flat, as at $d$, whereby the top or bottom of the can will rest on said face, the object of which is to prevent buckling or warping of said top or bottom by heat during the dipping and soldering operation.

The can is placed on the head E and the presser-clamp F advanced against its top and locked with the notched standard $b$, whereby the can is securely and immovably held on the head E, the carriage being elevated and sustained by the lever K while the can is being clamped to the head. The lever K is then moved clear of the carriage, and the latter is pressed down by hand, or a lever or treadle suitably applied, whereby the edges of the top or bottom of the can are dipped into the solder, and the seams consequently closed. The carriage is now either raised by hand or the action of the weighted levers J or treadles suitably applied, so as to elevate the can from the solder, and the lever K is moved under the carriage so as to sustain it, the lever of the presser-clamp disengaged from the locking-standard $b$, and the can is free to be removed and reversed, so that its other top or bottom may be dipped and soldered, or a new can applied for such purpose.

It is evident that the carriage C may remain stationary and the solder-pot made movable without affecting the nature of my invention. In this case the guides B are passed or extended loosely through the solder-pot and fastened below in the furnace.

Should solder drop or flow into the head E during the dipping and soldering operations, it will force open the valve when the head is elevated, and thus escape into the solder-pot.

Having thus described my invention, what I claim as new, and desire to secure by Letters Patent, is—

1. The combination, with the solder-pot A, of the carriage C, having the suspended head E, and the presser-clamp F, the lever K whereof is pivoted to the post $a'$ and engages with the locking-standard $b$, both post and standard rising from the carriage and moving with it, substantially as and for the purpose set forth.

2. The carriage C, with head E, in combination with the lever K, substantially as and for the purpose set forth.

3. The combination, with the soldering-pot A and carriage C, having hangers D, of the can-supporting head E, formed with groove or recess $a$ and flat solid face $d$, substantially as and for the purpose set forth.

4. The combination, with the soldering-pot A, of the can-supporting head E, provided with one or more valves, L, substantially as and for the purpose set forth.

5. The carriage C and can-supporting head E, in combination with the gages H, substantially as and for the purpose set forth.

JAMES W. FARRELL.

Witnesses:
JOHN A. WIEDERSHEIM,
A. P. GRANT.